United States Patent [19]

Ohta et al.

[11] Patent Number: 4,938,315
[45] Date of Patent: Jul. 3, 1990

[54] APPARATUS FOR EXCHANGING OIL FOR DEVICE HAVING OIL PAN FOR CIRCULATING OIL THEREBETWEEN

[75] Inventors: Yasuto Ohta; Masaru Kawabe; Fumitaka Uemura; Yoshiyuki Satoh; Naohiko Suzuki, all of Tokyo, Japan

[73] Assignee: Tokyo Tatsuno Co., Ltd., Tokyo, Japan

[21] Appl. No.: 288,885

[22] Filed: Dec. 23, 1988

[30] Foreign Application Priority Data

Apr. 14, 1988 [JP] Japan .................................. 63-90259

[51] Int. Cl.⁵ ............................................ F16N 33/00
[52] U.S. Cl. .................................. 184/1.5; 184/105.1; 184/108
[58] Field of Search ..................... 184/1.5, 14, 105.1, 184/108; 417/403, 36, 37

[56] References Cited

U.S. PATENT DOCUMENTS 4,193,487 3/1980 Takeuchi ............................... 184/1.5
4,513,578 4/1985 Proctor et al. ......................... 62/292
4,627,244 12/1986 Willhoft ................................ 62/380

FOREIGN PATENT DOCUMENTS 2231100 1/1974 Fed. Rep. of Germany .
2252462 5/1974 Fed. Rep. of Germany .
52-24637 2/1977 Japan .
63-16115 1/1988 Japan .
63-57808 3/1988 Japan .

Primary Examiner—Stephen F. Husar
Assistant Examiner—Alan Cariaso
Attorney, Agent, or Firm—Sughrue, Mion, Zinn, Macpeak & Seas

[57] ABSTRACT

Apparatus for exchanging waste oil with fresh oil in a device such as torque converter, based on a new finding that extracting waste oil from the pan thereof, supplying fresh oil thereinto and after the lapse of some pause time such extract and supply are repeated during said torque converter is kept to operate to circulate oil between the converter proper and the oil pan. The repetition of extract, supply and pause is automatically done according to the operation design stored in the computer with determining the total amount of extracted waste oil and fresh oil to be supplied.

5 Claims, 6 Drawing Sheets

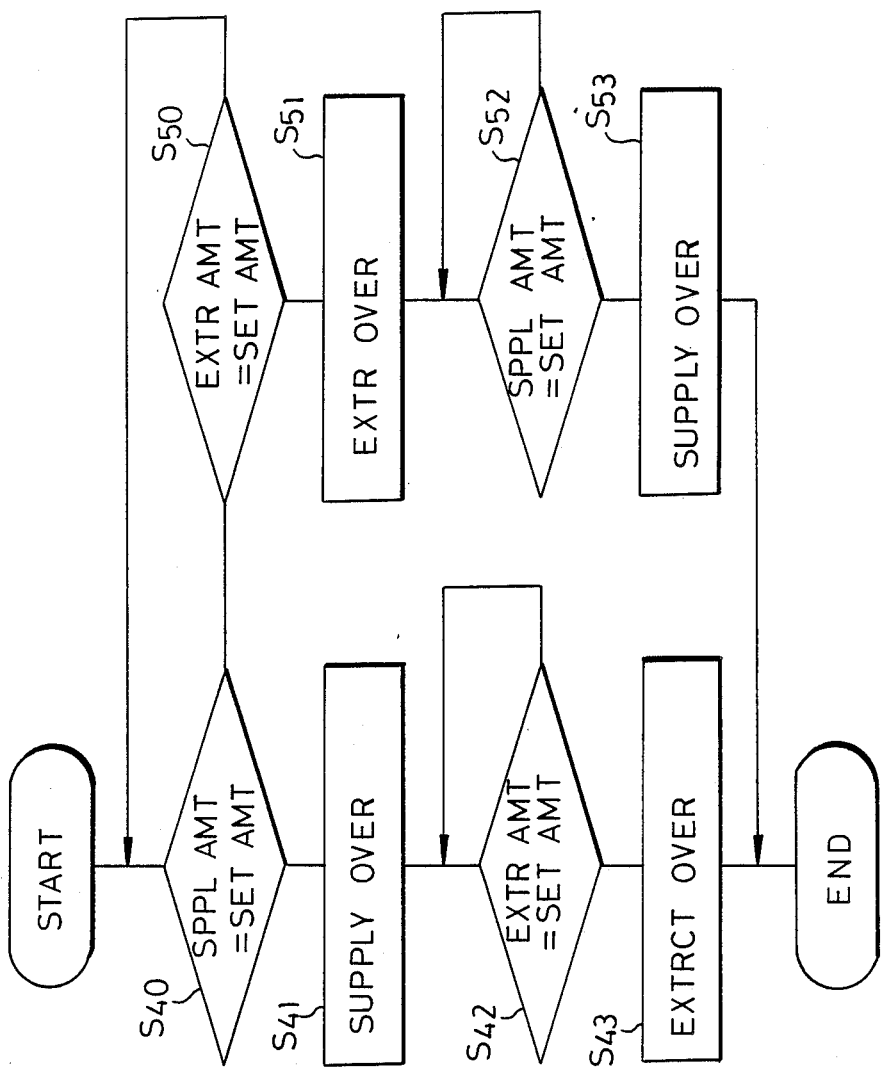

APPARATUS FOR EXCHANGING OIL FOR DEVICE HAVING OIL PAN FOR CIRCULATING OIL THEREBETWEEN

BACKGROUND OF THE INVENTION

The invention relates to an apparatus for exchanging waste oil with fresh oil. More particularly it relates to the oil exchange apparatus for a device having an oil pan so as to circulate oil between the device and the pan, such as a hydromatic torque converter provided in motor vehicles.

The torque converter or automatic transmission comprises a pump impeller connected with an engine output shaft to drive, through actuating oil, a turbine impeller, which is connected with a sun-and-planetary gears transmission so as to change the output torque. Since such actuating oil is subjected to severe load, fatigued oil must be exchanged after the lapse of some time period.

Even if waste oil in pan of the torque converter is exchanged, there is still a some amount of waste oil remaining in the converter. It is, thus, necessary to drive the engine for a while, e.g. one minute for sucking up fresh oil newly supplied in the pan and exhausting waste oil remaining in the converter into the pan, whereby newly supplied oil is inevitably contaminated. Such treatment must be repeated at least a few or several times in order to almost completely exchange waste oil with fresh one.

Thus, an operator must thrust a hose nozzle for extracting waste oil to be taken into a can therefor and another hose nozzle for supplying fresh oil from another can alternately in the oil pan and each time actuate the respective pump and valve, which must be repeated a plurality of times. This is not only troublesome but also takes considerable time.

It has been found to our astonishment as a result of experiments that extracting waste oil and supplying fresh oil during idly driving the engine can attain an oil change in a fairly shorter time with far less labour.

Furthermore, in the past, flowmeters have been used for metering the amount of extracting waste oil and of supplying fresh oil. This is unsatisfactory in that there occurs a discrepancy between the both metered amount of extracted waste oil and supplied fresh oil, due to that the temperature of the waste oil in the oil pan is above 80° C. while the temperature of the fresh oil is about 20° C. and it comes to difference of the weight of metered oils, even if the volumetric amount of the oils are exactly metered by the flowmeters. It is another cause of the discrepancy that the flowmeter will operate when the hose nozzle sucks air due to, for instance, inadequate thrust the same in the oil pan.

SUMMARY OF THE INVENTION

An object of the invention is, thus, to provide an apparatus for more efficiently exchanging oil for the device of the art referred to above, based on said new finding and consequently during idly driving the engine to keep the device in operation to circulate oil between the device and the oil pan.

Another object is to provide the oil exchange apparatus capable of ensuring the amount of oil extracted from the device and supplied thereto to be correct.

These objects can be attained fundamentally by an appartus according to the invention, which comprises a pair of vessels one for waste oil to be taken and the other for fresh oil stored to supply, a pair of solenoid valves and pumps for extracting waste oil and supplying fresh oil, a pair of conduits respectively extending from said vessels through said concerned valve and pump, each of the other ends of which is connected to one and common nozzle, means for determining the amount of waste and fresh oils, and means for controlling said valves and pumps.

The means for determining the oil amount is preferably in the form of a single load cell which is so arranged as to determine the total amount of waste oil and fresh oil contained in said respective vessel.

The controlling means is preferably in the form a microcomputor connected with said valves, pumps and load cell so as to proceed with repeated extracting waste oil and supplying fresh oil respectively in the amounts predetermined according to stored informations or operation of a keyboard.

The invention will be explained in more detail in respect of preferred embodiments in reference to the accompanying drawings.

BRIEF DESCRIPTION OF THE DRAWINGS

FIG. 4 is a flow sheet for judging whether or not the amount of supplied fresh oil reaches at the set amount and the amount of extracted waste oil reaches at the set amount.

DESCRIPTION OF THE PREFERRED EMBODIMENTS

Figure 1:
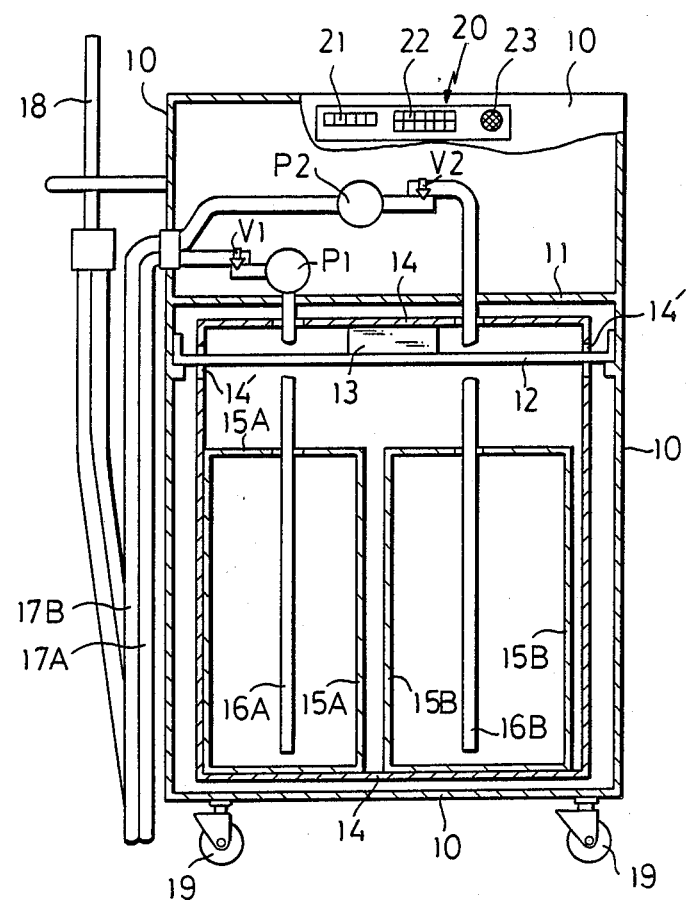
FIG. 1 is a schematic front elevation partly in section of the apparatus according to the invention.

In reference to FIG. 1, the apparatus of the invention has six casing walls 10 to form a substantially rectangular parallelpiped box, the interior of which is divided by a partition wall 11 into upper and lower rooms. In the upper portion of the lower room, there is mounted a transverse bar 12 between the opposite side walls 10, 10, on which a load cell 13 is mounted so as to support a box 14 at the top wall thereof. The box 14 suspended on the load cell has opposite side walls each formed with a through hole 14' so that the cross bar 12 extending therethrough does not prevent the box 14 from freely moving up and down a little. A bottom wall has a waste oil vessel 15A and a fresh oil vessel 15B placed so that the total amount of waste and fresh oils in the vessels may be determined by load cell 13.

A conduit 16A is extended from vessel 15A through a pump P1 and a solenoid valve VI respectively mounted on said partition wall 11, the other end of which is connected with a flexible hose 17A at one end thereof via a connector fixed at the side casing wall 10. The other end of which is connected with a nozzle 18, so that when valve VI is opened and pump P1 is driven waste oil may be extracted from the oil pan not shown to be taken into the vessel 15A. A conduit 16B is similarly extended from the fresh oil vessel 15B through a solenoid valve V2 and a pump P2 to be connected with a flexible hose 17B at one end thereof, of which free end is connected with said common and single nozzle 18, so that when valve V2 is opened and pump P2 is normally driven fresh oil may be supplied from the vessel 15B into the oil pan.

The apparatus is preferably provided with a plurality of casters 19 to be freely movable toward a motor car not shown for oil exchange and apart therefrom.

On the front casing wall 10, there is provided a panel of controlling means represented generally by 20. The panel is provided with an indicator 21 showing the oil amount to be determined by the load cell 13, a key board 22 for actuating said controlling means 20 and setting the total amount of oil to be extracted and subsequently supplied, and a speaker or any other warning device 23.

Figure 2:
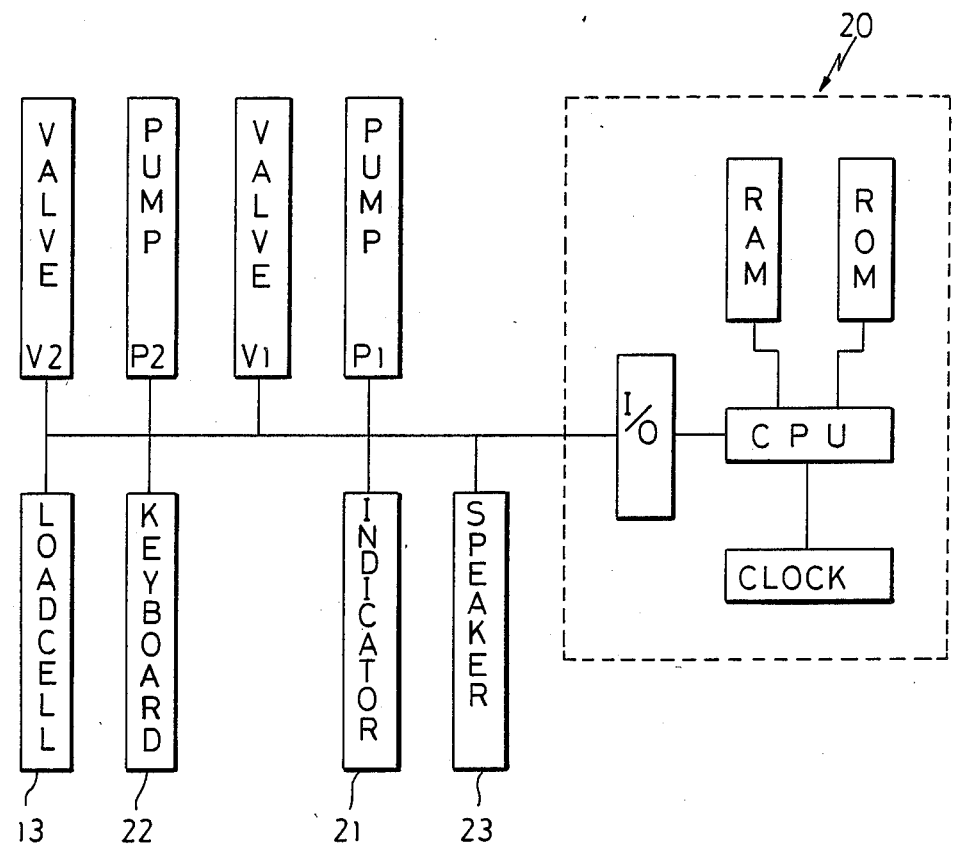
FIG. 2 is a block diagram of the controlling means, FIG. 3 (A+B) is a flow sheet showing oil exchanged process based on the total amount of oil to be exchanged which is varied depending on the motor car type with using the apparatus of the invention.

In reference to FIG. 2, the controlling means 20 comprises a central processing unit CPU which is connected with the pumps P1, P2, the solenoid valves V1, V2, the load cell 13, the key board 22 and so on through an input-output device I/O. There are furthermore arranged a read only memory ROM, a random access memory RAM and a clock respectively connected with the central processing unit CPU.

Conventionally, waste oil is extracted in a suitable amount and then a corresponding amount of fresh oil is supplied, which is repeated a plurality of times as referred to above so that some error in the oil amount in every extraction and supply step due to, for instance, the use of flowmeters and the temperature difference in the both oils may be accumulated which may lead to disadvantage, in function of the device such as the torque converter, which can be avoided according to the apparatus of the invention, having the single load cell 13 determining the total amount of waste and fresh oils.

Furthermore, it often fails to extract the intended amount of waste oil due to irrelevant holding of the hose nozzle in the oil pan in the device so as to such not oil but air. According to the apparatus of the invention, not only is such failure reduced because one and common nozzle is kept as it is during and through the oil exchange operation for both extracting and supplying, but also it is made possible for the apparatus of the invention to give warning on the irrelevant holding of the nozzle so as to make additional extracting.

It is necessary to fill the hose for supplying fresh air therewith before oil exchange in order to prevent waste oil from entering therein via the single nozzle when extracting waste oil, which is necessary and possible for the apparatus of the invention.

The oil exchange process with using the apparatus of the invention is based on the total mount of oil to be exchanged, which is naturally varied e.g. 6l, 7l, 8l, and 9l depending on a size of the torque converter or a motor car type. Depending on the total oil amount, suitable amounts of oil firstly extracted and then supplied, and consequently extracted and then supplied as well as a time of pause in order to attain as far efficient and complete oil exchange as possible are designed e.g. as follows.

|   | Step |   | Total Oil Amount To Be Exchanged And Set | | | |
|---|---|---|---|---|---|---|
|   |   |   | 6l | 7l | 8l | 9l |
| 1st | Extracted | (W1) | 1.5l | 1.5l | 1.5l | 1.5l |
|   | Supplied | (W2) | 2.3l | 2.3l | 2.3l | 2.3l |
|   | Pause | (T1) | 1 min. | 1 min. | 1 min. | 1 min. |
| 2nd | Extracted | (W3) | 2.3l | 2.3l | 2.3l | 2.3l |
|   | Supplied | (W4) | 2.3l | 2.3l | 2.3l | 2.3l |
|   |   |   | -continued | | | |
|   | Step |   | Total Oil Amount To Be Exchanged And Set | | | |
|   |   |   | 6l | 7l | 8l | 9l |
|   | Pause | (T2) | 4 min. | 4 min. | 4 min. | 4 min. |
| 3rd | Extracted |   | 2.2l | 2.3l | 2.3l | 2.3l |
|   | Supplied |   | 1.4l | 2.3l | 2.3l | 2.3l |
|   | Pause |   |   | 4 min. | 4 min. | 4 min. |
| 4th | Extracted |   |   | 0.9l | 1.9l | 2.3l |
|   | Supplied |   |   | 0.1l | 1.1l | 2.2l |
|   | Pause |   |   |   |   | 4 min. |
| 5th | Extracted |   |   |   |   | 0.6l |
|   | Supplied |   |   |   |   |   |
|   | Pause |   |   |   |   |   |

In case where oil exchange process is made e.g. in respect of the small size torque converter to be operated by oil of totally 6l, in the first step 1.5l waste oil is extracted and 2.3l fresh oil is supplied, after one minute pause in the second step 2.3l oil is extracted and 2.3l oil is supplied, after four minutes pause 2.2l oil is extracted and then 1.4l oil is supplied according to this design of oil exchange, which has been stored in advance in controlling means. It is possible of course to automatically convert the weight determined by the load cell into the corresponding volume in view of the known specific gravity of oil.

Figure 3A:
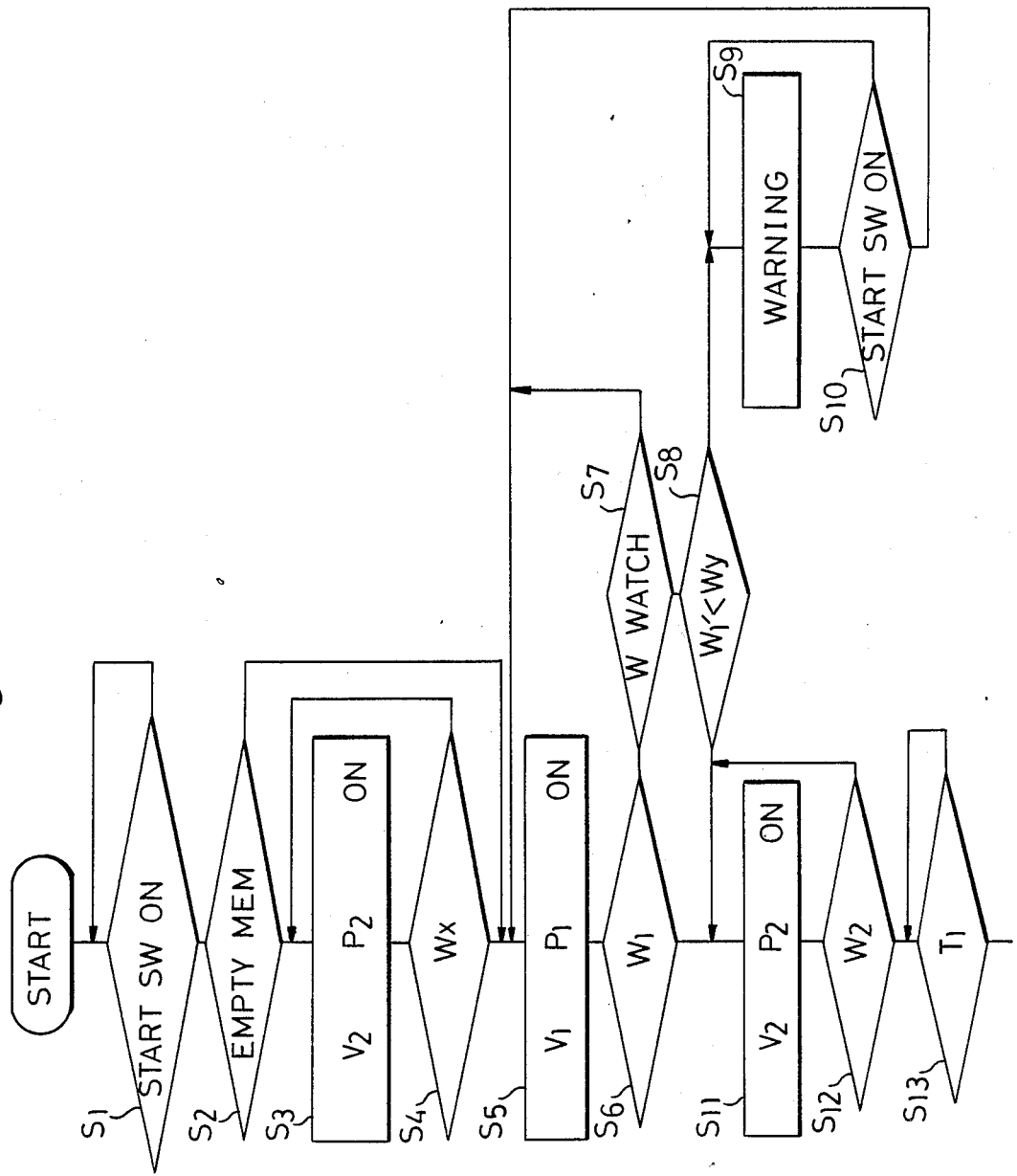
Figure 3B:
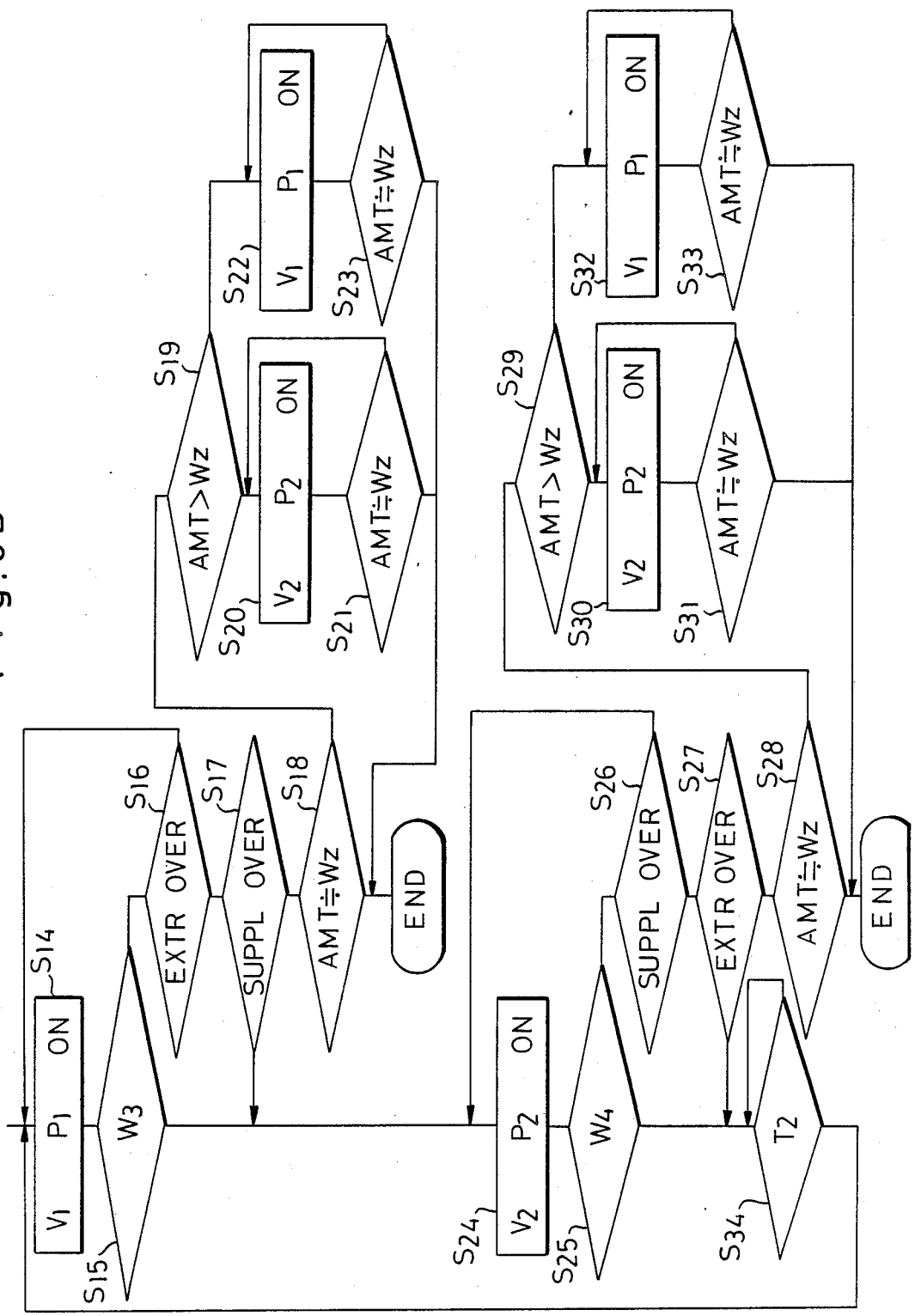

Now in reference to FIG. 3, in order to select a pattern of extraction, supply and pause e.g. "6l" is inputted by actuating the key board 22 so as to proceed with operation as referred to above. When thrusting the single nozzle 18 in the oil pan of the torque converter (not shown) which is idly driven for keeping to circulate oil between the torque converter and the oil pan, and actuating a start switch of the key board 22 (Step 1), the controlling means 20 judges whether the hose 17B is empty or filled with fresh oil (Step 2).

If stored in the memory that fresh oil is pulled out of said hose 17B by reversely driving the pump P2 in the last operation to be empty, the valve V2 and the pump P2 is actuated to supply fresh oil in the predetermined amount Wx (e.g. 120 g) corresponding to the capacity of said hose (Step 3), as explained later with referring to FIG. 5. When the amount Wx of fresh oil fed into the hose 17B is determined to reach a known amount Wx according to the load cell by watching the oil total amount change (Step 4), pump P2 and valve V2 are deactivated so that fresh oil is kept in said hose without falling down due to gravity thereof since said hose is air tightly closed by valve V2. If the hose 17B is found to be filled with fresh oil in Step 2, the Steps 3 and 4 are omitted so as to directly proceed with Step 5. Then the pump P1 and the valve V1 are actuated to extract waste oil from the pan to be taken into the vessel 15A through the common nozzle 18, the hose 17A and the conduit 16A (Step 5). Due to fresh oil filled in the hose 17B, waste oil can not enter the hose.

When a predetermined amount W1 of waste oil is extracted (1.5l) which is determined by the load cell 13 as increase of the total oil amount, P1 and V1 are deactivated (Step 6), and instead the pump P2 and the valve V2 are actuated to supply fresh oil in the predetermined amount W2 to the oil pan (Step 11).

If the hose 17B is found to be filled with fresh oil, the Steps 3 and 4 are omitted so as to directly proceed with Step 5.

If during watching of oil amount change (Step 7) there is caused no increase of total oil amount, i.e. increase of waste oil taken into the vessel 15A is not recognized, which means that the nozzle 18 is irrelevantly held in the oil pan from the beginning or in the middle of oil extracting operation, an amount of oil extracted W1' is compared with a predetermined amount Wy (e.g. 1.0l). If W1' is more than Wy, the nozzle 18 is considered to be fairly held in the oil pan and extracting of waste oil is stopped to proceed with Step 11. When W1' is zero or less than Wy, the pump P1 and the valve V1 are once deactivated and warning by syntherized voice "IRRELEVANT NOZZLE INSERTION" or any other means is given (Step 9) so that the nozzle 18 may be correctly held in the oil pan and then the start switch of the key board 22 is actuated again by the operator (Step 10) for proceeding with said Step 5.

When fresh oil amount W2 reaches a predetermined amount (e.g. 2.3l) (Step 12), the pump P2 and the valve V2 are deactivated so that the apparatus is paused (e.g. 1 minute) (Step 13), during which waste oil in the torque converter is exhausted into the pan and fresh oil is pumped into the converter by the idly driven engine of the motor vehicle.

After the lapse of the pause which is controlled by the clock and the stored operation design in the controlling means 20, the valve V1 and the pump P1 are actuated again (Step 14) to extract waste oil in the predetermined amount (e.g. 2.3l) (Step 15). After completion of Step 15, the valve V1 and the pump P1 are deactivated and instead the pump P2 and the valve V2 are actuated to supply fresh oil in the predetermined amount W4 to the oil pan (Step 24).

Since the amount of oil is not extracted and supplied in every step but the total amount of extracted and supplied oil is important, it is preferable to make reference to stored information according to a flow sheet in FIG. 4 on which explanation is made later, if the amount of extracted oil reaches the predetermined value or not, after completion of a cycle of extracting and supplying operation. This reference is carried out in Step 16. If the response is YES i.e. that extraction is over, the valve V1 and the pump P1 are deactivated to similarly make reference to stored information according to the flow sheet of FIG. 4 (Step 17). If the response is NO in Step 16, Steps 14 and 15 are conducted again. When the response is YES in Step 17, the total amount of extracted waste oil and remaining fresh oil in the respective vessels 15A, 15B and then determined by the load cell 13 is compared with the amount Wz determined when beginning the operation (Step 18) according to the load cell 13. When both are equal, the operation is stopped. When both are not equal, it is judged whether the amount determined then is larger or smaller than Wz (Step 19). When the response shows that it is larger than Wz which means that amount of supplied oil is short or that of extracted oil is excess, since the latter of which can not be corrected now, the valve V2 and the pump P2 are actuated to supply fresh oil (Step 20) with considering the matter to be the former. When the total amount is made equal to the amount Wz determined and stored when beginning the operation (Step 21), the operation is stopped (END).

When the response is NO in Step 19, i.e. that the total amount determined then is less than Wz, which means that the amount of extracted oil is too little or that the amount of supplied oil is too much, since the latter of which can not be corrected now, the valve V1 and the pump P1 are actuated so as to extract waste oil (Step 22). When the total amount reaches the value Wz (Step 23), the operation is stopped (END).

When the response is YES in Step 15, and NO in Step 17, Step 24 begins as referred to above so as to actuate the valve V2 and the pump P2 for supplying fresh oil. When the amount thereof reaches W4 (e.g. 2.3l), the valve and pump are deactivated to stop the operation so that the apparatus is put to a pause for a while (e.g. T2=4 minutes) (Step 34) similar to the situation in Step 13.

It is preferable, however, to make reference to information by the flow sheet of FIG. 4, if the total supplied amount reaches at the predetermined value or not (Step 26). If the response in Step 26 is YES, valve V2 and pump P2 are deactivated to make reference to the information on waste oil extraction (Step 27). When the response is NO in Step 26, Steps 24 and 25 are conducted again. When the response in Step 27 is NO, Step 34 is taken, but if the response is YES, the total amount of extracted waste oil and remaining fresh oil is compared with amount Wz (Step 28) as in Step 18. When the response is that the both amount is equal, the operation is stopped there (END), but if the response is not equal it is judged whether the amount then determined is larger or smaller than Wz (Step 29). When the response is YES, i.e. that it is larger, the valve V2 and the pump P2 are actuated to supply fresh oil (Step 30) so that when the total oil amount reaches at said Wz (Step 31) valve V2 and pump P2 are deactivated to stop the operation (END). When the response is NO, i.e. that the total amount then determined is less than said Wz in Step 29, the valve V1 and the pump P1 are actuated to extract waste oil (Step 32). When the total amount of both oils are made equal (Step 33), the operation is stopped (END).

When the response is YES in Step 25 and NO in said Step 27, the operation is put to the second pause T2 as in the above example. After the lapse of said pause, the operation is repeated from Step 14 until the response in Steps 18, 21 or 23 or in Steps 28, 31 or 33 may become YES to stop the operation (END).

Now in reference to FIG. 4 showing a flow sheet in which it is judged whether or not the amount of supplied fresh oil reaches at the set amount (Step 40) and the amount of extracted waste oil reaches at the set amount (Step 50).

When the amount then determined by the load cell 13 reaches the set amount in Step 40, SUPPLY IS OVER is stored in controlling means 20 (Step 41), which is utilized in FIG. 3 as referred to above. Further when the amount of extracted waste oil reaches at the set amount (Step 42), EXTRACT IS OVER is stored (Step 43) which is also utilized in FIG. 3 as referred to above so as to stop the operation (END).

When the amount then determined by the load cell reaches the set amount in Step 50, EXTRACT IS OVER is stored (Step 51). Further when the amount of supplied fresh oil reaches the set amount (Step 52), SUPPLY IS OVER is stored (Step 53) to stop the operation (END).

Figure 5:
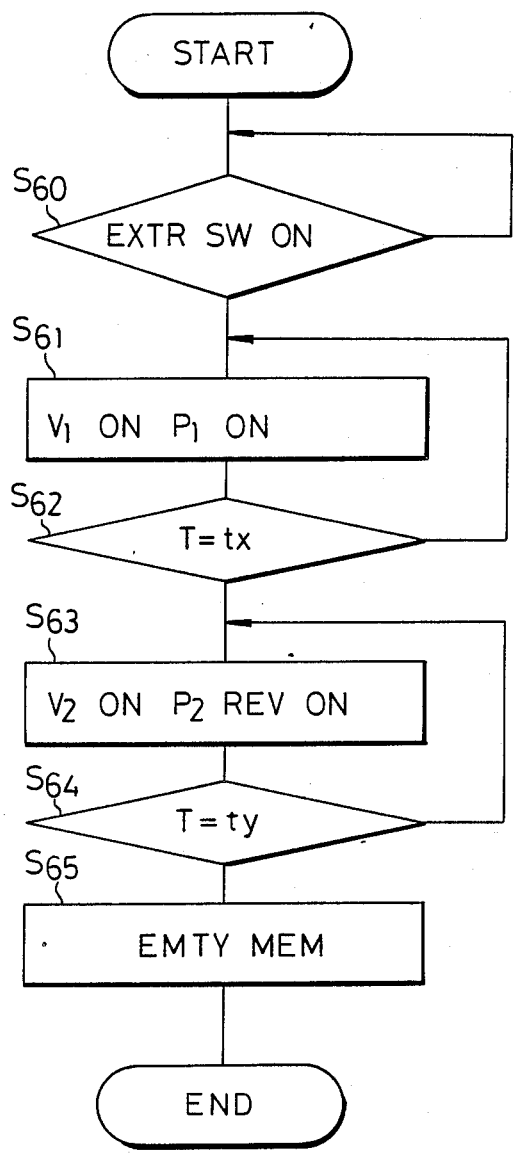
FIG. 5 is a flow sheet for empty hoes at the last stage of the operation.

Finally in reference to FIG. 5, which shows a flow sheet of making the hoses 17A, 17B and the conduit portions empty at the last stage of oil change operation in order to prevent waste and fresh oils in hoses from falling in drops.

When the final oil exchange is over, the hose nozzle 18 is taken out of the oil pan of the torque converter to be hung up and a concerned switch of the key board 22 is actuated to be on (Step 60), whereby the controlling means 20 actuates the valve V1 and the pump P1 for drawing waste oil out of the hose 17A to be taken into the vessel 15A (Step 61). After the lapse of a time period tx necessary therefor (e.g. five seconds) (Step 62), the valve V1 and the pump P1 are deactivated, and instead the valve V2 is opened and the pump P2 is reversely driven to draw fresh oil out of the hose 17B to be taken back into the vessel 15B (Step 63). After the lapse of a time period ty necessary therefor (Step 64), HOSE EMTY is stored in the controlling means 20 (Step 65).

When commencing the oil exchange operation, it is firstly inquired whether or not information is stored so that fresh oil may be filled into the hose 17B when the response is YES, as referred to above.

What is claimed is:

1. Apparatus for exchanging oil comprising:
   a pair of vessels one for waste oil to be taken and the other for fresh oil stored to supply;
   a pair of solenoid valves and pumps for extracting waste oil and supplying fresh oil;
   a pair of conduits respectively extending from said vessels through said concerned valve and pump, each other ends of which is connected to one and common nozzle;
   means for determining the amount of waste and fresh oils;
   a key board;
   an indicator;
   controlling means connected with the valves, pumps, indicator for actuating thereof and with the determining means and key board to be actuated thereby and so programmed that the first solenoid valve and pump are actuated to extract waste oil in some amount to be taken into the first vessel through the single nozzle and the first conduit, then the second solenoid valve and pump are actuated to supply fresh oil in some amount from the second vessel through the second conduit and the single nozzle, and actuation thereof is paused for some time period, which is repeated a few or several times to be stopped when the total amount of the extracted and supplied oil which is determined by the determining means reaches at a preset amount, and a warning device connected with the controlling means so that, when an amount of the first extracted oil is insufficient in comparison with a predetermined value, the warning device is energized so that the nozzle can be rearranged in place.

2. Apparatus as set forth in claim 1, in which the determining means is a single load cell which is so arranged as to determine the total amount of waste oil in the first vessel and fresh oil in the second vessel.

3. Apparatus as set forth in claim 1, in which before stopping the operation thereof either of additional extracting and supplying of oil is made so that the total amount of oils in the two vessels may be the same with the total amount when beginning the operation.

4. Apparatus as set forth in claim 3, in which after said additional operation, waste oil remained in said first conduit is taken into said first vessel and then fresh oil remained in said second conduit is returned to said second vessel.

5. Apparatus as set forth in claim 4, in which before beginning the operation thereof fresh oil is fed in such an amount as to just fill said second conduit.

* * * * *